United States Patent [19]
Koivunen

[11] 3,838,611
[45] Oct. 1, 1974

[54] TRANSMISSION HAVING INTERMEDIATE FLUID UNIT

[75] Inventor: Erkki A. Koivunen, Livonia, Mich.

[73] Assignee: General Motors Corporation, Detroit, Mich.

[22] Filed: Nov. 9, 1972

[21] Appl. No.: 305,156

[52] U.S. Cl. .................................... 74/730, 74/731
[51] Int. Cl. ........................................... F16h 47/00
[58] Field of Search ...................... 74/730, 731, 655

[56] References Cited
UNITED STATES PATENTS

| | | | |
|---|---|---|---|
| 2,623,411 | 12/1952 | Herndon | 74/730 |
| 2,671,359 | 3/1954 | Scheiter | 74/730 |
| 2,737,824 | 3/1956 | Livermore | 74/731 |
| 3,027,721 | 4/1962 | Mamo | 60/54 |
| 3,147,595 | 9/1964 | Liang | 60/54 |
| 3,614,902 | 10/1971 | Candellero | 74/730 |

Primary Examiner—Samuel Scott
Assistant Examiner—P. S. Lall
Attorney, Agent, or Firm—Charles R. White

[57] ABSTRACT

Transmission in which a hydrodynamic fluid unit is disposed between a torque transmitting clutch package and change speed planetary gearing controlled by concentrically disposed friction drive establishing devices. There is smooth power transfer during gear changes featuring a shift from a freewheel to a band for second and a band to clutch for third. This construction requires minimum space and is sufficiently short for vertical installations. There is an oil pump located in the end of the transmission case which is directly driven by central shafting from the engine.

1 Claim, 1 Drawing Figure

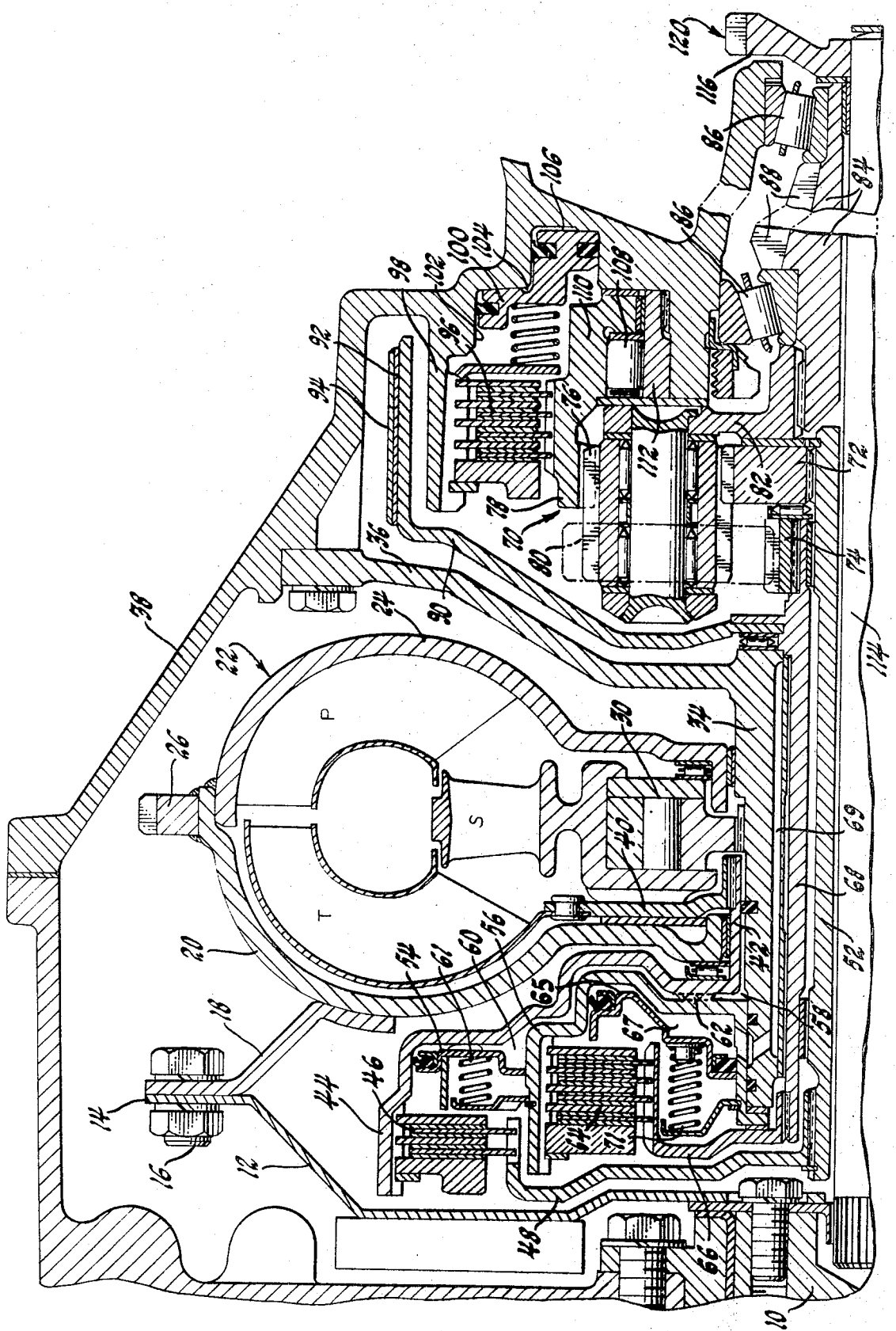

TRANSMISSION HAVING INTERMEDIATE FLUID UNIT

This invention relates to a new and improved transmission in which a hydrodynamic fluid unit driven by an input is interposed between a drive clutch assembly and a change speed gear unit controlled by a plurality of concentrically positioned friction drive establishing devices.

Small compact vehicles have limited space for the engine transmission power package and require smaller transmissions. Additionally, smaller transmissions are needed to provide additional space in the power package compartment for accessories and pollution control devices. Vertical mounted transmissions have been used in some designs to provide additional space but have generally not been employed because of their excessive lengths. Transmissions with shorter lengths have generally required extensive modification of the clutches, fluid units and gearsets which increased their diameters and made them unacceptable.

In this transmission there is a new and improved arrangement of the fluid unit, the clutch package, change speed gearing and the transmission oil pump that provides for a transmission shorter in length and with no substantial increase in diameter. This transmission which can be used in a vertical installation in a vehicle features a fluid unit such as a hydrodynamic torque converter positioned between a clutch package and a change speed gear unit. In the preferred form of the invention the clutch package comprises a rotatable drum positioned adjacent to and driven by a turbine assembly of the fluid unit. A pair of concentric friction clutches are positioned in the drum and are individually and selectively engageable by hydraulically actuated servo motors to provide separate power paths from the turbine assembly into the gearing. To further reduce transmission length the oil pump for this transmission is located at the end of the transmission casing and is driven mechanically by central shafting from the engine. A new and improved braking drum construction is provided for holding a control member of the gear unit for reaction. This braking drum is concentric with two other friction drive establishing devices in the transmission to control the ratios available with the gear unit. A one way brake automatically engages for low range forward to provide for simplified controls. A shift from the one way brake to a band for second and from the band to a front clutch for third provides for smooth power transfer during gear changes.

These and other features, objects and advantages of this invention will be more apparent from the following detailed description and drawing in which:

The FIGURE is a side sectional view of a portion of a transmission incorporating this invention.

The FIGURE shows a power transmission in which there is an engine driven shaft 10 drivingly connected to an annular shell 12 formed with a flat outer flange 14. Bolts 16 extend through flange 14 and drivingly connect shell 12 to spaced drive lugs 18 that are fastened to the front cover 20 of a hydrodynamic torque converter 22. The torque converter 22 has a rear cover 24 which is welded to the front cover 20 to form a rotatable housing, on which there is secured an annular starter gear 26 drivingly connected to an engine starter not shown.

The torque converter 22 has a pump P which comprises a plurality of blades that are secured to the inside of the rear cover 24 and to an inner annular shell. Positioned adjacent to the pump P is a bladed turbine T that comprises a plurality of blades secured between annular inner and outer shells positioned within the housing of the converter.

A bladed stator S, disposed between pump P and turbine T, is mounted on a one-way brake 30. The one-way brake has cam rollers operatively disposed between outer and inner races connected respectively to the inner hub of the stator S and to a ground sleeve 34. The ground sleeve extends longitudinally within the transmission and terminates in an annular flange 36 that is bolted to a transmission casing 38 which surrounds the converter and other components of the transmission. The turbine T is riveted to the annular flange of a hub 40 that is splined to a longitudinally extending sleeve 42 of an annular drum 44 positioned between the front cover of the converter and the shell 12. This drum houses a multi-plate clutch 46 which has metal plates splined to the interior of the drum interleaved with friction faced plates keyed to the periphery of an annular clutch support hub 48 centrally splined to a tubular torque transmitting shaft 52 that extends longitudinally in the transmission. The clutch 46 is selectively engaged by a hydraulically actuated piston assembly 54 which is mounted on an inner drum 56 nested inside of the outer drum. Fluid fed from hydraulic controls, not shown, through the passage 58 to apply chamber 60 causes the piston assembly to move longitudinally to effect the drive engagement of the multi-plate clutch 46 so that turbine T drives shaft 52. Return springs 61 move the piston assembly 54 to the off position when apply oil is exhausted from chamber 60.

The inner drum 56 is welded or otherwise secured at 62 to the outer drum 44 so that it is also driven by the turbine. The inner drum houses a multi-plate clutch 64 that has steel plates splined to the interior wall of the inner drum interleaved with friction faced plates splined to an annular clutch support 66. This clutch support is centrally splined to a tubular torque transmitting shaft 68 that is coaxial with shaft 52.

Clutch 64 is selectively engaged by a hydraulically actuated piston assembly 65 in response to the supply of apply oil to a piston apply chamber 67 from the controls through passage 69. Return springs 71 are employed to move piston 65 to the off position when the apply pressure is exhausted from chamber 67. The two torque transmitting shafts 52 and 68 extend longitudinally within the transmission into driving engagement with input gears of a planetary gearset 70. As shown, shaft 52 is splined to a sun gear 72 while shaft 68 is splined to a sun gear 74 that is located alongside sun gear 72. In addition to sun gears 72 and 74, the planetary gearset 70 has long planet pinions 76 that mesh with sun gear 72, a ring gear 78 and with short planetary pinions 80. The short planetary pinions 80 mesh with the sun gear 74 which is driven by shaft 68. The meshing planet gears 76 and 80 are rotatably supported on a carrier 82 which is splined to a longitudinally extending output shaft 84 rotatably mounted by a pair of roller bearings 86 in the housing 38. Output shaft 84 has a beveled output gear 88 that meshes with the ring gear of a differential unit, not shown.

The end portion of shaft 68 adjacent to sun gear 74 is connected to a drum 90 that has an outer cylindrical friction surface 92 which is selectively engaged by an annular brake band 94 to hold sun gear 74 for reaction. This brake band is selectively operated by a hydraulically actuated servo, not shown, when fed with pressure fluid from the hydraulic controls.

Located radially inwardly of the band brake 94 is a multi-plate brake 96 that has steel plates splined to longitudinally extending internal annular wall 98 of housing 38 which are interleaved with lined plates splined to the ring gear 78. This multi-plate brake is engaged by an annular, hydraulically-actuated piston 100 that is mounted for axial movement in a bore 102 formed in the housing 38 when chambers 104 and 106 are charged with apply oil from the controls. Positioned radially inwardly of the multi-plate brake 96 is a one-way roller brake 108 that has an outer race 110 integral with an extending portion of the ring gear 78. This one-way brake has an inner race 112 that is splined to the case 38. The one-way brake 108 engages in response counterclockwise to torquing of the ring gear 78, viewing the transmission input, to hold ring gear 78 stationary to condition the planetary gear unit 70 for low range drive as will be more fully explained below. Centrally extending in the transmission is a shaft 114 that drivingly connects input shaft 10 to an input gear 116 of an oil pump assembly 120 which pumps oil, in response to the rotation of the engine, to provide pressure oil for the transmission and transmission controls.

For first range drive the clutch 46 and the one-way brake 108 are engaged. Under these conditions the drive is through the converter into shaft 52 to drive the sun gear 72 of the planetary gearset 70. The one-way brake 108 holds the ring gear 78 for reaction so that the planetary gearset multiplies converter torque for a large reduction ratio low range drive. For second, clutch 46 is maintained in engagement as the brake band 94 is applied to drum 92 so that the sun gear 74 is held for reaction. With sun gear 72 being driven through the clutch 46 and with sun gear 74 held, the one-way brake overruns and transmission is conditioned for an intermediate speed ratio. For cruising both clutches 46 and 64 are engaged so that the elements of planetary gearset are locked for rotation together. For low coast the clutch 46 and multi-plate brake 96 are engaged. Under these conditions the engine can be used as a brake with the vehicle road wheels driving output shaft 84. When the reverse drive is desired, the outer clutch 46 is released and the inner clutch 64 is applied as the multi-plate brake 96 is engaged. Under these conditions the sun gear 72 will be driven by the converter and the ring gear 78 will be held for reaction so that the carrier and transmission output are driven in a reverse direction.

While a preferred embodiment of the invention has been shown and described in detail to illustrate the invention, various changes and modifications may be made thereto without departing from the scope of the invention set forth in the following claims.

I claim:

1. A power transmission comprising transmission input and output means, a hydrodynamic torque transmitting unit having separate input and output rotor means and a rotatable housing for said rotor means, connector means drivingly connecting said transmission input to said rotatable housing, clutch unit means positioned between said transmission input and said rotatable housing, said clutch unit comprising housing means drivingly connected to said output rotor means and separate first and second selectively engageable clutch means, said housing means comprising concentric outer and inner drums respectively drivingly connected to said first and second clutch means, piston means in each of said drums for engaging said clutch means, first and second support means extending respectively into said outer and inner drums for respectively supporting said first and second clutch means and supporting said second clutch means radially inwardly of said first clutch means, a change speed planetary gear unit operatively positioned between said hydrodynamic torque transmitting unit and said output means, first and second torque transmitting means connected respectively to said first and second support means extending axially through said hydrodynamic torque transmitting unit to drivingly connect said first and second clutch means to said planetary gear unit, said planetary gear unit having planetary gear carrier means drivingly connecting said planetary gear unit to said output means, a casing for said transmission, a reaction drum in said casing disposed around said planetary gear unit and operatively connected to said planetary unit, brake band means selectively engageable with said reaction drum to condition said planetary gear unit for a predetermined forward drive speed ratio when said first clutch means is engaged, a multi-plate brake unit mounted in said casing radially inwardly of said reaction drum and operatively connected to said planetary gear unit, piston means in said casing for engaging said multi-plate brake unit to condition said planetary gear unit for a reverse drive ratio when said second clutch means is engaged, a one way brake mounted in said casing radially inwardly of said multi-plate brake unit for automatically conditioning said planetary gear unit for another forward drive speed ratio when said first clutch means is engaged, oil pump means positioned adjacent to said output means and torque transmitting means extending directly from said input means axially through said hydrodynamic unit and said planetary gear unit for driving said oil pump means.

* * * * *